Sept. 15, 1936.  C. WANTZ  2,054,348
SEALING CONNECTION
Filed Oct. 1, 1934
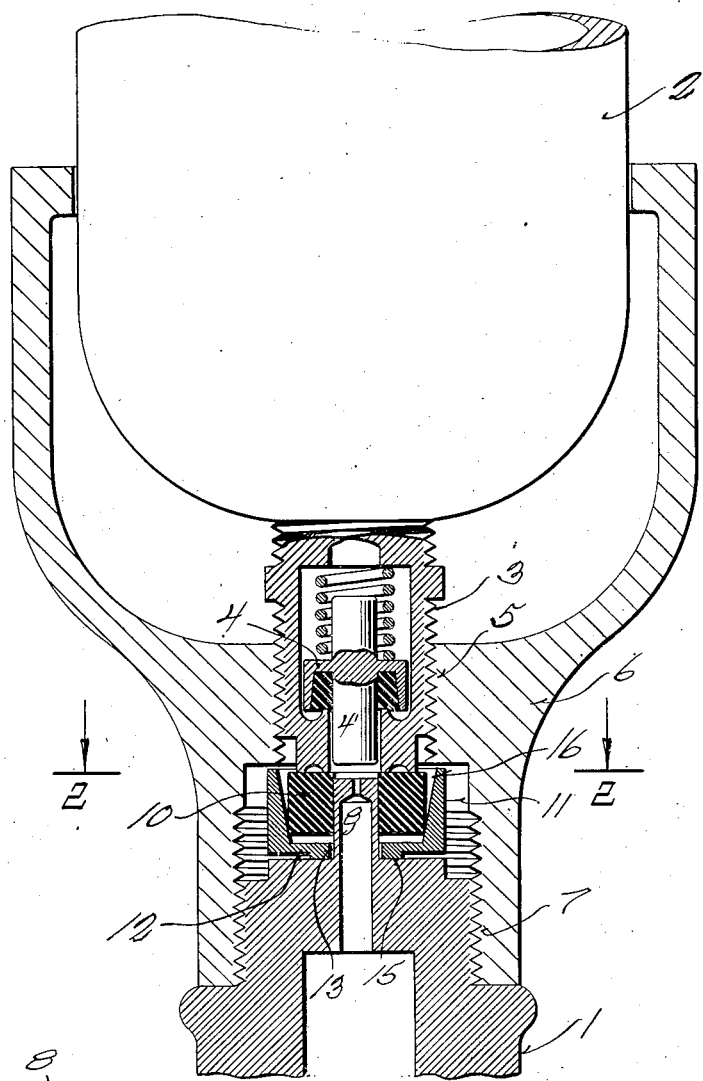
Fig.1
Fig.2
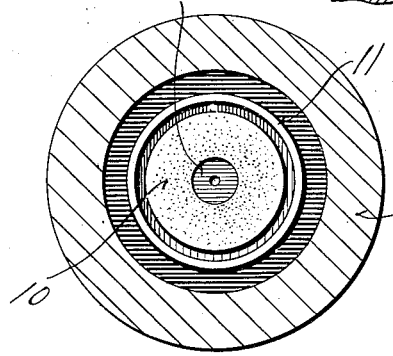
INVENTOR.
Clarence Wantz
BY
ATTORNEYS Patented Sept. 15, 1936

2,054,348

UNITED STATES PATENT OFFICE 2,054,348

SEALING CONNECTION

Clarence Wantz, Milwaukee, Wis., assignor to Milwaukee Gas Specialty Company, a corporation of Wisconsin Application October 1, 1934, Serial No. 746,350

5 Claims. (Cl. 284—14)

This invention relates to a coupling or sealing connection for parts which are mechanically engaged and disengaged by relative rotary movement, as, for example, parts which are mechanically interconnected by means of threaded members.

One of the principal objects of the invention is to provide a coupling or sealing connection of this character which not only affords a secure mechanical connection and a hermetic seal but which avoids destructive wear on the sealing element.

Another object is to accomplish these purposes in a construction which is simple in its nature, durable in use, readily and conveniently manipulated to engage or disengage the parts and easy and comparatively inexpensive to manufacture.

Other objects and advantages reside in certain novel features of the construction, arrangement and combination of parts which will be hereinafter more fully described and particularly pointed out in the appended claims, reference being had to the accompanying drawing, forming a part of this specification, and in which:

Figure 1 is a fragmentary view partly in side elevation and partly in transverse vertical section showing one construction in which the invention may be advantageously embodied; and Figure 2 is a view in horizontal section taken on line 2—2 of Figure 1.

Referring to the drawing, the numeral 1 designates one of the parts and the numeral 2 the other part which are to be coupled together by means affording a sealed connection therebetween. The invention is applicable to parts of any character designed to be so interconnected and sealed where the engagement and disengagement is effected by a relative rotary movement.

In the present instance, and for the sake of illustration only, part 1 is a fitting adapted to be connected with the tap rod of a beer tap, and part 2 illustrates a portion of a holder or cartridge for carbon dioxide gas. This holder 2 has an externally threaded discharge nipple 3 equipped with a spring closed discharge valve 4. The nipple 3 is threaded into an internally threaded opening 5 provided therefor in a connecting and guard member 6, one end of which guard member is threadedly connected to the fitting 1, as indicated at 7, and the other end of which telescopes over the holder 2. The fitting 1 has a valve trip pin 8 which, in the assembly, is designed to engage the stem 4' of the valve 4 and lift the valve off its seat.

For the purpose of constraining the gas which flows past the valve 4 to pass through the valve trip pin 8 and into the fitting 1, a sealing washer 10 is provided. This washer is made up of rubber or other suitable material and is of annular form to surround the pin 8 and engage the end of the discharge nipple 3. A metal cup 11 receives and supports this washer 10. This cup 11 has its base 12 provided with a central opening 13 through which the valve pin 8 extends. Adjacent the central opening the bottom or base of the cup may be enlarged as at 15 to reduce the area of contact between the cup and the fitting 1, for the purpose of supporting the cup for free relative rotary movement with respect to the fitting 1 and the valve trip pin 8. It will be noted that the annular body of the cup is beveled or tapered as indicated at 16.

In couplings of the type which include means for opening a valve as a connection is made, there exists a problem in making a tight seal prior to the opening of the valve. With such a problem in mind the sealing washer 10, in its normal uncompressed state, rests with the bottom edges of its outer peripheral side in contact with the inner beveled surface of the wall of the cup 11 and with its bottom slightly spaced from the bottom of the cup. The top surface of the washer 10 extends slightly above the top of the trip pin 8. It should also be noted that the lower end of the nipple 3 projects beyond the lower end of the valve stem 4'. With this arrangement, when the discharge nipple of the holder 2 is threaded into opening 5, the lower end of the nipple 3 will engage the top surface of the sealing washer, compressing said washer, and forcing the washer down into the cup 11. The engagement between the nipple and the washer causes a tight seal therebetween, while the reaction of the beveled walls of the cup 11 against the lower outer periphery of the washer as it is forced into the cup causes a tight seal to be made between the washer and the trip pin 8. This sealing is accomplished prior to the engagement between the trip pin 8 and the valve stem 4' to release the valve 4. Additional threading down of the holder 2 causes the nipple 3 to further compress the washer 10 and the engagement between trip pin 8 and valve stem 4' is effected to open the valve 4. If during the turning movement of nipple 3 there was relative turning movement between it and the top surface of the washer 10, the edges of the end of the nipple 3 would cut into and chafe the top surface of the washer. To avoid this relative movement, the cup 11 is supported as indicated at 15 and is free to turn. The washer 10 and the cup 11 therefore turn as a unit with the discharge nipple 3. There is, of course, relative turning movement between the washer 10 and the trip pin 8, but engagement between these two parts presents no metal edge contacting the rubber surface, as is present between the nipple and washer, and no cutting action of the rubber occurs. The seals thus provided are effective as the washer 10 is under active compressive forces operative both in vertical and horizontal planes.

With a coupling and sealing connection of this character the parts are hermetically sealed so that escape of the gas is prevented. The engagement and disengagement of the parts and the setting up or breaking down of the seal is realized by a simple turning movement of the gas holder 2. Nevertheless, injury to the sealing element or washer 10 is avoided and its effectiveness is enhanced and its life prolonged.

While I have shown and described one construction in which the invention may be advantageously embodied, it is to be understood that this construction has been selected merely for the sake of illustration or example and that various changes may be made in the size, shape and arrangement of the parts without departing from the spirit of the invention or the scope of the subjoined claims.

The invention claimed is:

1. A sealing connection for threadedly interconnected parts including a nipple fixed to one of said parts and rotatable therewith and a tubular projection fixed to the other of said parts, a cup resting on one of the parts and having an opening in its base through which said projection extends, said cup being rotatable relative to said projection and to the part on which it rests and a single annular washer in said cup and surrounding said projection, said nipple being engageable with the washer to compress it into sealing engagement with itself and with said projection, said cup rotating with said washer under the influence of said nipple to preclude relative rotary movement between the nipple and the washer.

2. A sealing connection for parts mechanically engaged and disengaged by relative rotary movement and comprising a single sealing element having a plurality of contact surfaces, one surface of said element being in sealing engagement with one of said parts and another surface of said element normal to said first mentioned surface being in sealing engagement with the other of said parts, and a carrier for said element mounted on one of said parts and rotatable relative thereto, said carrier and said element being movable as a unit with the other of said parts.

3. A sealing connection for parts mechanically engaged and disengaged by relative rotary movement and comprising a single sealing element having a plurality of contact surfaces, one surface of said element being in sealing engagement with one of said parts and another surface of said element normal to said first mentioned surface being in sealing engagement with the other of said parts, and a carrier for said element mounted on one of said parts and rotatable relative thereto, said carrier and said element being movable as a unit with the other of said parts, said carrier reacting with the other surfaces of said element to cause said element as said parts are moved together by relative rotary movement to be compressed in both vertical and horizontal planes.

4. In a coupling device, a pair of threadedly interconnected members, one of said members having a release valve, the other of said members having a trip pin adapted to engage and release said valve as said members are moved together by relative rotating movement, a cup rotatably mounted over said trip pin, a sealing element in said cup engaging the peripheral sides of said pin, said element presenting a sealing surface normal to that surface engaging said pin, the member containing said release valve engaging with said last mentioned surface of said element as said parts are moved together by relative rotation and effecting a seal between said member and said element, further relative rotation of said members causing said element and cup to rotate as a unit with said valve carrying member, while causing compression of said element, said cup reacting against said element when under compression to cause a seal between said element and the peripheral sides of said pin, whereby a seal is effected between said members prior to the opening of said valve, and further relative movement of said parts effecting the opening of said valve.

5. A sealing connection for parts mechanically engaged and disengaged by relative rotary movement and comprising a single sealing element engaged and compressed in a vertical plane by one of said parts and engaged in a horizontal plane by the other of said parts, a cup rotatably mounted on one of said parts and containing said sealing element, said cup and sealing element being rotatable as a unit with the other of said parts after sealing engagement has been made between said last part and said element, said cup reacting to cause compression of said element to effect the sealing engagement with said part carrying said cup.

CLARENCE WANTZ.